United States Patent
Oh et al.

(10) Patent No.: US 12,014,268 B2
(45) Date of Patent: Jun. 18, 2024

(54) BATCH NORMALIZATION LAYER TRAINING METHOD

(71) Applicant: LG ELECTRONICS INC., Seoul (KR)

(72) Inventors: Seung-Kyun Oh, Seoul (KR); Jinseok Im, Seongnam-si (KR); Sanghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 987 days.

(21) Appl. No.: 16/814,578

(22) Filed: Mar. 10, 2020

(65) Prior Publication Data

US 2021/0034972 A1 Feb. 4, 2021

(30) Foreign Application Priority Data

Aug. 2, 2019 (KR) .................. 10-2019-0094523

(51) Int. Cl.
*G06N 3/08* (2023.01)
*G06N 3/04* (2023.01)
(52) U.S. Cl.
CPC .............. *G06N 3/08* (2013.01); *G06N 3/04* (2013.01)
(58) Field of Classification Search
CPC .. G06N 3/08; G06N 3/04; G06N 3/02; G06N 3/088; G06N 3/09; G06N 3/084; G06N 3/045; G06N 3/082
See application file for complete search history.

(56) References Cited

U.S. PATENT DOCUMENTS

2016/0217368 A1* 7/2016 Ioffe .................. G06N 3/08
2020/0134448 A1* 4/2020 Sivakumar ............ G06N 3/063

OTHER PUBLICATIONS

Cooijmans, Tim, et al. "Recurrent batch normalization." arXiv preprint arXiv: 1603.09025 (2016) (Year: 2016).*
Ioffe, S., "Batch renormalization: Towards reducing minibatch dependence in batch-normalized models," Advances in Neural Information Processing Systems 30 (2017) 9 pp. (Year: 2017).*

* cited by examiner

*Primary Examiner* — Brian M Smith
(74) *Attorney, Agent, or Firm* — Birch, Stewart, Kolasch & Birch, LLP

(57) ABSTRACT

Disclosed is a batch normalization layer training method, which may be used in a neural network learning apparatus having limited operational processing capability and storage space. A batch normalization layer training method according to an embodiment of the present disclosure may perform batch normalization transform by setting the gradients of the standard deviation and the mean of the loss function to zero, and applying a normalized statistic value obtained from an initial neural network or a previous neural network to the gradient of the loss function. The neural network learning apparatus of the present disclosure may be connected or converged with an Artificial Intelligence module, an Unmanned Aerial Vehicle (UAV), a robot, an Augmented Reality (AR) apparatus, a Virtual Reality (VR), a 5G network service-related apparatus, etc.

11 Claims, 5 Drawing Sheets

[FIG. 1]
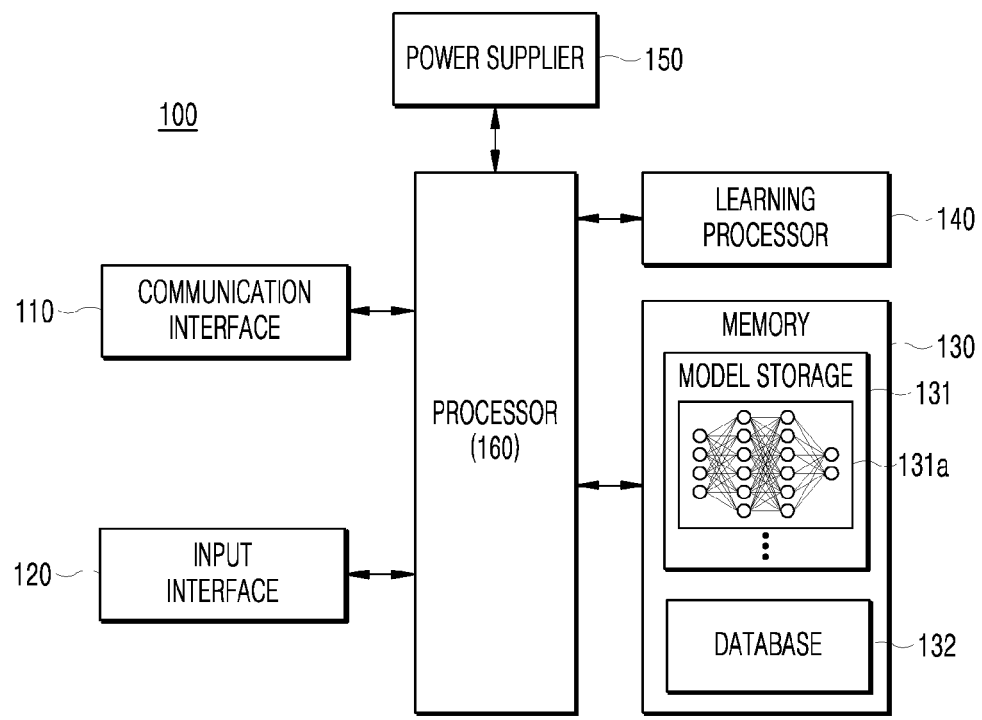

[FIG. 2]
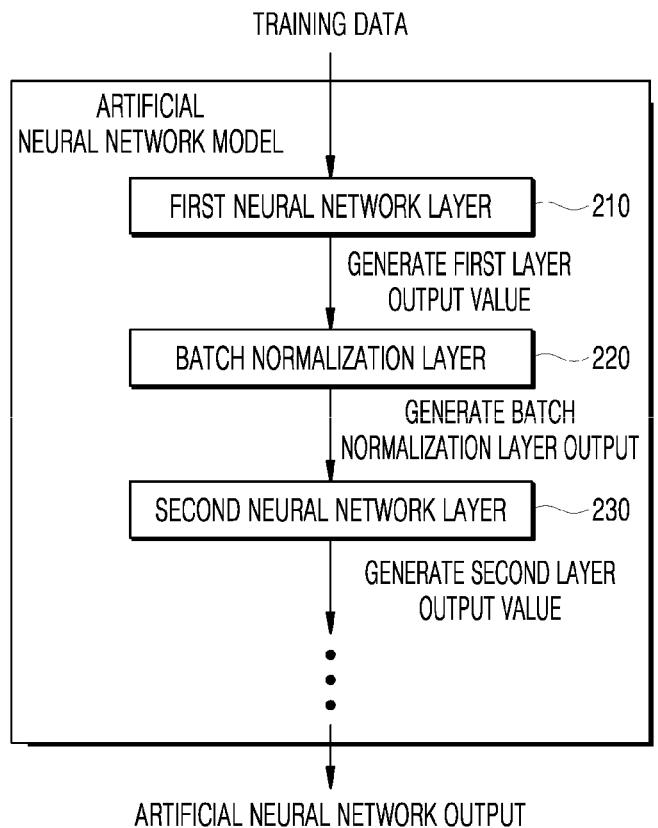
[FIG. 3]
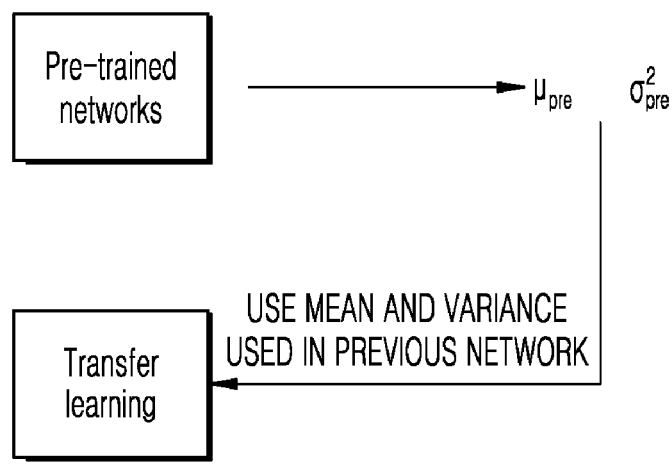

[FIG. 4]
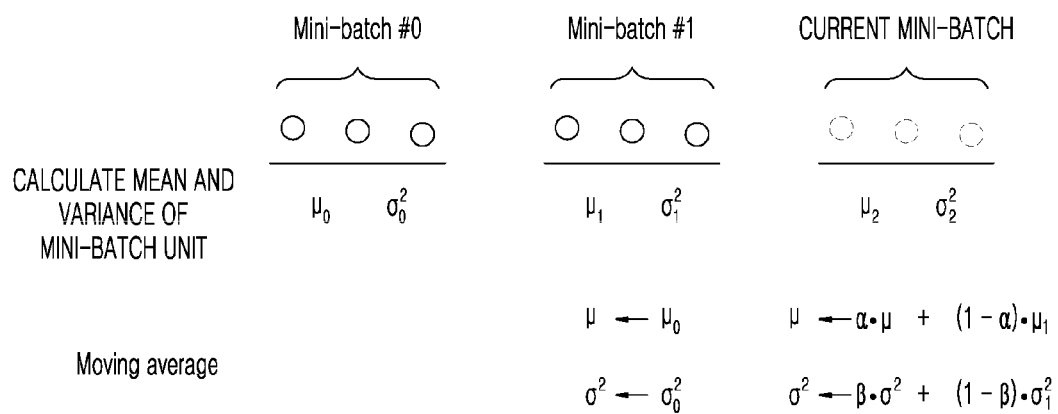

[FIG. 5]
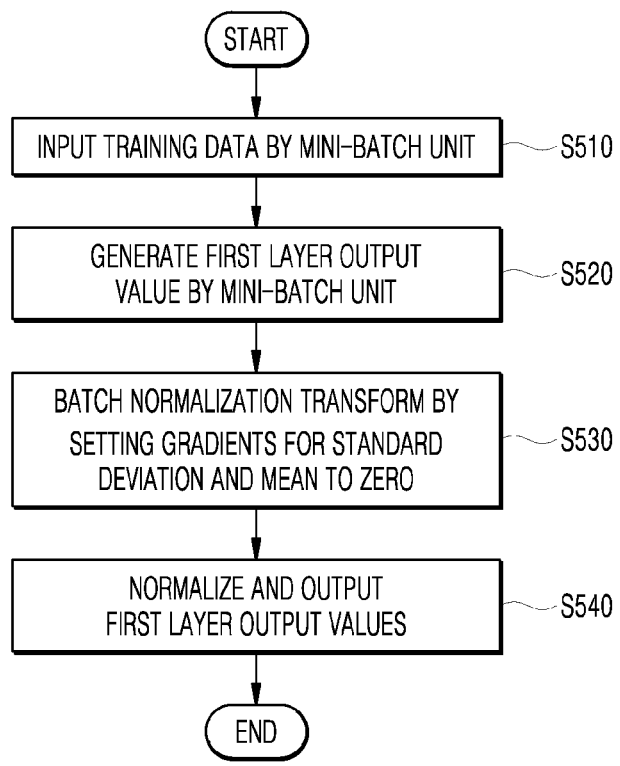

[FIG. 6]
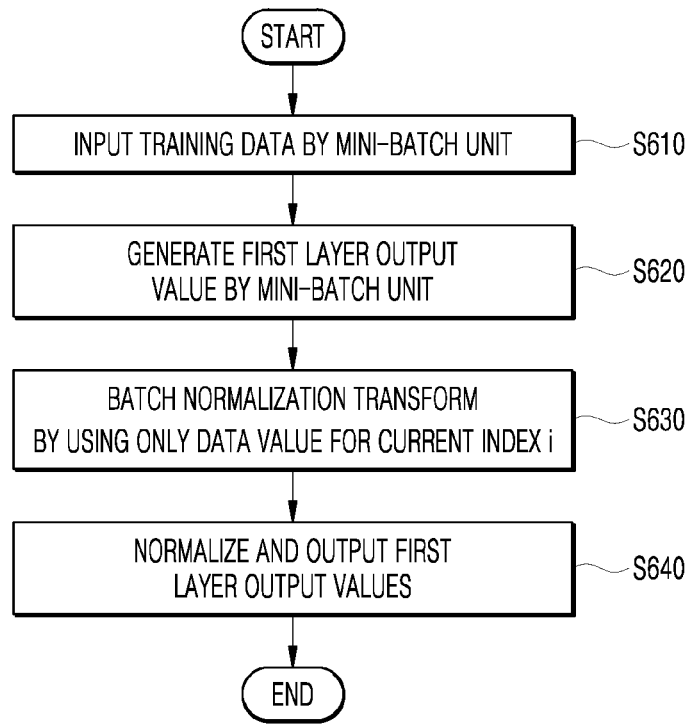

BATCH NORMALIZATION LAYER TRAINING METHOD

CROSS-REFERENCE TO RELATED APPLICATION

This present application claims the benefit of priority to Korean Patent Application No. 10-2019-0094523, entitled "BATCH NORMALIZATION LAYER TRAINING METHOD," filed in the Republic of Korea on Aug. 2, 2019, the entire disclosure of which is incorporated herein by reference.

BACKGROUND

1. Technical Field

The present disclosure relates to a batch normalization layer training method, and more particularly, to a method for training a batch normalization layer in an on-device neural network learning apparatus.

2. Description of Related Art

Recently, as an Artificial intelligence technology develops, the artificial intelligence technology is applied and introduced in various industries.

In particular, recent performance enhancement in a processing apparatus, such as a general-purpose processor and a dedicated accelerator, enables driving of an artificial intelligence deep learning algorithm that requires a large amount of operations, thereby performing a new function to go beyond an existing function in various electronic apparatuses.

For example, a robot cleaner may recognize an object in a space, and perform additional functions, such as avoiding collision, setting an optimum path, and preventing a crime, etc. by using a camera mounted thereon in addition to the cleaning function, which is an inherent role.

In the past, the object recognition technique was applied based on a legacy algorithm that extracts and compares the unique feature of the object to be recognized, but recently, a study is being attempted to apply artificial intelligence deep learning, in order to improve the accuracy of the recognition rate for various objects.

Recently, a Deep Neural Network (DNN) model composed of a convolution layer has been much studied for the object recognition algorithm using deep learning generally.

However, in the learning (training) of the deep neural network model, there has been a problem in that Gradient Vanishing or Gradient Exploding may occur in the neural network learning process due to a change in the distribution of input values of each layer caused by a change in the parameter of the previous layers.

Accordingly, in order to learn the deep neural network model, it has been necessary to set the learning rate low, and to conditionally determine the initial parameters carefully, and there has been a problem in that the learning time is delayed or the difficulty of non-linear learning gradually increases.

In order to solve these problems, U.S. Patent Publication No. 2016/0217368 discloses a batch normalization method for calculating and normalizing a mean and a standard deviation for each feature.

Since this batch normalization method normalizes and learns by a mini-batch unit, it may reduce an internal covariate shift that may occur during artificial neural network learning, and is much introduced to the recent deep learning algorithm because the learning result converges quickly.

However, since the batch normalization layer (BN layer) used in the batch normalization method uses a statistic value of data in a mini-batch unit, there has been a problem that fast operational processing capability and a large amount of storage space are required.

In addition, since the batch normalization method calculates the statistic value by the mini-batch unit, there has been a problem in that learning is not immediately performed, and learning is delayed because it is performed in each mini-batch unit.

Accordingly, a study for performing a batch normalization method in an on-device neural network learning apparatus having limited operational processing capability and storage space is being conducted.

RELATED ART DOCUMENT

Patent Document (Patent Document 1) U.S. Patent Publication No. 2016/0217368

SUMMARY OF THE DISCLOSURE

The present disclosure is intended to solve the above problems, and an object of the present disclosure is to provide a batch normalization layer training method in a neural network apparatus having limited operational processing capability and storage space.

In addition, another object of the present disclosure is to provide a batch normalization layer training method, which performs a batch normalization transform without calculating the statistic value of the current mini-batch unit in order to solve the problem that a processing delay occurs in the learning.

A neural network learning apparatus according to an embodiment of the present disclosure includes an input interface for inputting training data for learning of an artificial neural network model, and a learning processor for training the artificial neural network model by using the training data, and the artificial neural network model may include a batch normalization layer between a first neural network layer and a second neural network layer, the first neural network layer may generate first layer output values by a mini-batch unit by receiving the training data by the mini-batch unit, the batch normalization layer may receive the first layer output values generated by the mini-batch unit, generate a batch normalization layer output by performing a batch normalization transform for the received first layer output values, and provide the generated batch normalization layer output as an input for the second neural network layer, and the batch normalization transform may transform by setting the gradient for the standard deviation of the loss function and the gradient for the mean of the loss function to zero, and transform by applying a normalized statistic value obtained from an initial neural network or a previous neural network to the gradient of the loss function.

In addition, in the neural network learning apparatus according to an embodiment of the present disclosure, the batch normalization transform may transform by setting the gradient for the standard deviation of the loss function and the gradient for the mean of the loss function to zero, and transform by applying a normalized statistic value of a mini-batch set operated before 1 mini-batch to the gradient of the loss function.

In addition, in the neural network learning apparatus according to an embodiment of the present disclosure, the batch normalization transform may transform by setting the gradient for the standard deviation of the loss function and the gradient for the mean of the loss function to zero, generate a data set by selecting previous training data except for a current index i by the number of data of a mini-batch set in the reverse order, calculate a normalized statistic value of the generated data set, and apply the calculated normalized statistic value of the data set to the gradient of the loss function.

A neural network learning apparatus according to an embodiment of the present disclosure includes an input interface for inputting training data for learning of an artificial neural network model; and a learning processor for training the artificial neural network model by using the training data, and the artificial neural network model may include a batch normalization layer between a first neural network layer and a second neural network layer, the first neural network layer may generate first layer output values by a mini-batch unit by receiving the training data by the mini-batch unit, the batch normalization layer may receive the first layer output values generated by the mini-batch unit, generate a batch normalization layer output by performing a batch normalization transform for the received first layer output values, and provide the generated batch normalization layer output as an input for the second neural network layer, and the batch normalization transform may transform by using only a data value for a current index i, and transform by applying a normalized statistic value obtained from an initial neural network or a previous neural network to the gradient of the loss function.

In addition, in the neural network learning apparatus according to an embodiment of the present disclosure, the batch normalization transform may transform by using only the data value for the current index i, and transform by applying a normalized statistic value of a mini-batch set operated before 1 mini-batch to the gradient of the loss function.

In addition, in the neural network learning apparatus according to an embodiment of the present disclosure, the batch normalization transform may transform by using only the data value for the current index i, and generate a data set by selecting previous training data except for the current index i by the number of data of a mini-batch set in the reverse order, calculate the normalized statistic value of the generated data set, and apply the calculated normalized statistic value of the data set to the gradient of the loss function.

In addition, in the neural network learning apparatus according to an embodiment of the present disclosure, the normalized statistic value may include the number of data per each set, the mean, and the standard deviation operated from each mini-batch set or the data set.

A batch normalization layer training method according to an embodiment of the present disclosure includes receiving training data by a mini-batch unit, generating first layer output values by the mini-batch unit, performing batch normalization transform for using the first layer output values as an input value for a second layer, and normalizing and outputting the first layer output values by using the batch normalization transform, and the batch normalization transform may transform by setting the gradient for the standard deviation of the loss function and the gradient for the mean of the loss function to zero, and transform by applying a normalized statistic value obtained from an initial neural network or a previous neural network to the gradient of the loss function.

In addition, in the batch normalization layer training method according to an embodiment of the present disclosure, the batch normalization transform may include transforming by setting the gradient for the standard deviation of the loss function and the gradient for the mean of the loss function to zero, and transforming by applying a normalized statistic value of a mini-batch set operated before 1 mini-batch to the gradient of the loss function.

In addition, in the batch normalization layer training method according to an embodiment of the present disclosure, the batch normalization transform may include transforming by setting the gradient for the standard deviation of the loss function and the gradient for the mean of the loss function to zero, generating a data set by selecting previous training data except for a current index i by the number of data of the mini-batch set in the reverse order, calculating a normalized statistic value of the generated data set, and applying the calculated normalized statistic value of the data set to the gradient of the loss function.

A batch normalization layer training method according to an embodiment of the present disclosure includes receiving training data by a mini-batch unit, generating first layer output values by the mini-batch unit, performing a batch normalization transform for using the first layer output values as an input value for a second layer, and normalizing and outputting the first layer output values by using the batch normalization transform, and the batch normalization transform may include transforming by using only a data value for a current index i, and transforming by applying a normalized statistic value obtained from an initial neural network or a previous neural network to the gradient of the loss function.

In addition, in the neural network training method according to an embodiment of the present disclosure, the batch normalization transform may include transforming by using only the data value for the current index i, and transforming by applying the normalized statistic value of a mini-batch set operated before 1 mini-batch to the gradient of the loss function.

In addition, in the batch normalization layer training method according to an embodiment of the present disclosure, the batch normalization transform may include transforming by using only the data value for the current index i, generating a data set by selecting previous training data except for the current index i by the number of data of a mini-batch set in the reverse order, calculating a normalized statistic value of the generated data set, and applying the calculated normalized statistic value of the data set to the gradient of the loss function.

In addition, in the batch normalization layer training method according to an embodiment of the present disclosure, the normalization statistic value may include the number of data per each set, the mean, and the standard deviation operated from each mini-batch set or the data set.

Meanwhile, as an embodiment of the present disclosure, a computer readable recording medium in which a program for executing the above-described method has been recorded may be provided.

The batch normalization layer training method according to an embodiment of the present disclosure may perform a batch normalization transform without calculating the statistic value of the current mini-batch unit, thereby being also used in the neural network apparatus having limited operational processing capability and storage space.

In addition, the batch normalization layer training method according to an embodiment of the present disclosure may perform the batch normalization transform without calculating the statistic value of the current mini-batch unit, thereby reducing the processing delay problem in the learning process.

BRIEF DESCRIPTION OF THE DRAWINGS

FIG. 1 is a block diagram illustrating a configuration of a neural network apparatus according to an embodiment of the present disclosure.

FIG. 2 is a diagram illustrating a structure of an artificial neural network model including a batch normalization layer according to an embodiment of the present disclosure.

FIG. 3 is a diagram illustrating a state where transfer learning is performed by using a mean and a variance obtained from the previous neural network model according to an embodiment of the present disclosure.

FIG. 4 is a diagram illustrating a state of obtaining a moving mean and a moving variance by using a mean and a variance up to the previous mini-batch, while calculating a mean and a variance by a mini-batch unit according to an embodiment of the present disclosure.

FIG. 5 is a flowchart for explaining a batch normalization layer training method that sets the gradients for a standard deviation and a mean to zero according to an embodiment of the present disclosure.

FIG. 6 is a flowchart for explaining the batch normalization layer training method that transforms by using only a data value for a current index i according to an embodiment of the present disclosure.

DETAILED DESCRIPTION OF THE EMBODIMENTS

Hereinafter, the embodiments disclosed in the present specification will be described in detail with reference to the accompanying drawings, the same or similar elements regardless of a reference numeral is denoted by the same reference numeral and a duplicate description thereof will be omitted. The suffixes "module" and "unit" for the element used in the following description are given or mixed considering only ease of writing specification, and do not have their own meaning or role. Wherever possible, the same reference numbers will be used throughout the drawings to refer to the same or like parts.

In the following description, known functions or structures, which may confuse the substance of the present disclosure, are not explained. The accompanying drawings are used to help easily explain various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, third, and the like, may be used herein to describe various elements, components, regions, layers, and/or sections, these elements, components, regions, layers, and/or sections should not be limited by these terms. These terms are generally only used to distinguish one element from another.

It should be understood that when an element is referred to as being "connected to," or "coupled to" another element, it may be directly connected or coupled to the other element, but intervening elements may also be present. The terms "connected" and "coupled" are not restricted to physical or mechanical connections or couplings, and may include electrical connections or couplings, whether direct or indirect.

The connection may be such that the objects are permanently connected or releasably connected.

Artificial intelligence (AI) is a field of computer engineering and information technology that researches a method for the computer to enable thinking, learning, self-development, etc. which are possible by human's intelligence, and means that the computer may imitate human's intelligent behavior.

In addition, the Artificial Intelligence does not exist in itself, but has many direct and indirect links with other fields of computer science. In recent years, there have been numerous attempts to introduce an element of AI into various fields of information technology to solve problems in the respective fields.

Machine Learning is a field of Artificial Intelligence, and a field of research that gives the ability capable of learning without an explicit program in the computer.

Specifically, the Machine Learning may be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

Many Machine Learning algorithms have been developed on how to classify data in the Machine Learning. Decision Tree, Bayesian network, Support Vector Machine (SVM), Artificial neural network (ANN), etc. are representative examples.

The Decision Tree is an analytical method that performs classification and prediction by plotting a Decision Rule in a tree structure.

The Bayesian network is a model of the probabilistic relationship (conditional independence) between multiple variables in a graphical structure. The Bayesian network is suitable for data mining through Unsupervised Learning.

The Support Vector Machine is a model of Supervised Learning for pattern recognition and data analysis, and mainly used for classification and regression.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that has artificial neurons (nodes) forming a network through synaptic interconnections, and acquires problem-solving capability as the strengths of synaptic interconnections are adjusted throughout training.

The terms 'artificial neural net' and 'neural network' may be used interchangeably herein.

An ANN may include a number of layers, each including a number of neurons. In addition, the Artificial neural network may include the synapse for connecting between neuron and neuron.

The Artificial neural network may be generally defined by three factors, that is, (1) a connection pattern between neurons of different layers, (2) a learning process updating the weight of connection, (3) an activation function generating an output value from the weighted sum of the input received from a previous layer.

The Artificial neural network may include network models of the method such as Deep Neural Network (DNN), Recurrent Neural Network (RNN), Bidirectional Recurrent Deep Neural Network (BRDNN), Multilayer Perceptron (MLP), and Convolutional Neural Network (CNN), but is not limited thereto.

In the present specification, the term 'layer' may be used interchangeably with the term 'class.'

An ANN may be classified as a single-layer neural network or a multi-layer neural network, based on the number of layers therein.

In general, a single-layer neural network may include an input layer and an output layer.

In addition, a general Multi-Layer Neural Network is composed of an Input layer, one or more Hidden layers, and an Output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The Output layer receives a signal from the hidden layer and outputs an output value based on the received signal. The Input signal between neurons is multiplied by each connection strength (weight) and then summed, and if the sum is larger than the threshold of the neuron, the neuron is activated to output the output value obtained through the activation function.

Meanwhile, the Deep Neural Network including a plurality of Hidden layers between the Input layer and the Output layer may be a representative Artificial neural network that implements Deep Learning, which is a type of Machine Learning technology.

The Artificial neural network may be trained by using training data. Here, the training may refer to the process of determining parameters of the artificial neural network by using the training data, to perform tasks, such as classification, regression analysis, and clustering of inputted data. Such parameters of the artificial neural network may include synaptic weights and biases applied to neurons.

An artificial neural network trained using training data may classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Then, among the thus inferred functions, outputting consecutive values is referred to as regression, and predicting and outputting a class of an input vector is referred to as classification.

In the Supervised Learning, the Artificial neural network is learned in a state where a label for the training data has been given.

Here, the label may refer to a target answer (or a result value) to be guessed by the artificial neural network when the training data is inputted to the artificial neural net.

Throughout the present specification, the target answer (or a result value) to be guessed by the artificial neural network when the training data is inputted may be referred to as a label or labeling data.

In addition, in the present specification, setting the label to the training data for training of the Artificial neural network is referred to as labeling the labeling data on the training data.

Training data and labels corresponding to the training data together may form a single training set, and as such, they may be inputted to an artificial neural network as a training set.

Meanwhile, the training data represents a plurality of features, and the labeling the label on the training data may mean that the feature represented by the training data is labeled. In this situation, the training data may represent the feature of the input object in the form of a vector.

Using training data and labeling data together, the artificial neural network may derive a correlation function between the training data and the labeling data. Then, through evaluation of the function derived from the artificial neural net, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural nets using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve to fool the discriminator as effectively as possible, while the discriminator evolves to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

The Reinforcement Learning may be mainly performed by a Markov Decision Process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, the loss function or cost function, a learning algorithm, an optimization algorithm, and so forth. Also, the hyperparameters are set before learning, and model parameters may be set through learning to specify the architecture of the artificial neural net.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural net. Learning in the artificial neural network involves a process of adjusting model parameters to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini-batches, and by performing gradient descent for each of these mini-batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural net, but also to choose proper hyperparameters.

In general, the artificial neural network is first trained by experimentally setting hyperparameters to various values, and based on the results of training, the hyperparameters may be set to optimal values that provide a stable learning rate and accuracy.

Hereinafter, the present disclosure will be described in detail with reference to the accompanying drawings.

FIG. 1 is a block diagram illustrating a configuration of a neural network apparatus 100 according to an embodiment of the present disclosure.

The neural network apparatus 100 may be an apparatus capable of performing machine learning by using training data, and may include an apparatus for learning by using a model composed of an artificial neural network.

That is, the neural network apparatus 100 may be configured to receive, classify, store, and output information to be used for data mining, data analysis, intelligent decision making, and a machine learning algorithm. Here, the machine learning algorithm may include a deep learning algorithm.

The neural network apparatus 100 may communicate with at least one external apparatus or terminal, and derive a result by analyzing or learning data on behalf of or by assisting the external apparatus. Here, the assistance of another apparatus may mean the distribution of operational power through distributed processing.

The neural network apparatus 100 is various apparatuses for learning an artificial neural network, and may generally mean a server, and may be referred to as a neural network learning apparatus or a neural network learning server, etc.

Particularly, the neural network apparatus 100 may be implemented not only as a single server but also as a plurality of server sets, a cloud server, or a combination thereof.

That is, the neural network apparatus 100 may be configured in plural to constitute a set of the neural network learning apparatus (or cloud server), and the at least one neural network apparatus 100 included in the set of the neural network learning apparatus may derive a result by analyzing or learning data through the distributed processing.

The neural network apparatus 100 may transmit a model learned by machine learning or deep learning to an external apparatus periodically or by request.

Referring to FIG. 1, the neural network apparatus 100 may include a communication interface 110, an input interface 120, a memory 130, a learning processor 140, a power supplier 150, a processor 160, etc.

The communication interface 110 may mean a configuration that includes a wireless communication interface and an input interface. That is, the communication interface 110 may transmit and receive data with other apparatuses through wired/wireless communication or an interface.

The input interface 120 may obtain input data, etc. for obtaining an output by using training data for learning the model or a trained model.

The input interface 120 may also obtain raw input data, and in this situation, the learning processor 140 or the processor 160 may generate training data or preprocessed input data that may be input to the model learning by preprocessing the obtained data.

At this time, the preprocessing for the input data performed by the input interface 120 may mean extracting an input feature from the input data.

In addition, the input interface 120 may also obtain data by receiving data through the communication interface 110.

The memory 130 may store a model learned by the learning processor 140 or the neural network apparatus 100.

At this time, the memory 130 may classify and store the learned model into a plurality of versions according to a learning time point or a learning progress level, etc. as necessary.

At this time, the memory 130 may store input data obtained by the input interface 120, learning data (or training data) used for model learning, and learning history of the model, etc.

At this time, the input data stored in the memory 130 may be not only data processed to be suitable for model learning, but also raw input data itself.

The memory 130 may include a model storage 131, a database 132, etc.

The model storage 131 stores the neural network model (or artificial neural network 131a) being learned or learned through the learning processor 140, and stores the updated model when the model is updated through the learning.

At this time, the model storage 131 may store by classifying the learned model into a plurality of versions according to a learning time point or a learning progress level as necessary.

The artificial neural network 131a illustrated in FIG. 1, is provided as an example of an artificial neural network including a plurality of hidden layers. However, an artificial neural network according to the embodiments of the present disclosure is not limited thereto.

The artificial neural network 131a may be implemented in hardware, software, or a combination of hardware and software. When some or all of the artificial neural network 131a are implemented in software, one or more instructions constituting the artificial neural network 131a may be stored in the memory 130.

The database 132 may store input data obtained by the input interface 120, learning data (or training data) used for model learning, learning history of the model, etc.

The input data stored in the database 132 may be not only data processed to be suitable for model learning, but also raw input data itself.

The learning processor 140 may train the artificial neural network 131a or make the artificial neural network 131a learn by using training data or a training set.

The learning processor 140 may learn the artificial neural network 131a by immediately obtaining data that has preprocessed the input data obtained by the processor 160 through the input interface 120, or learn the artificial neural network 131a by obtaining the preprocessed input data stored in the database 132.

More specifically, the learning processor 140 repeatedly trains the artificial neural network 131a using various training schemes previously described to determine optimized model parameters of the artificial neural network 131a.

In this specification, an artificial neural network whose parameter has been determined by being learned by using training data may be referred to as a learning model or a learned model.

At this time, the learning model may also infer a result value in a state that has been mounted in the learning apparatus 100 of the artificial neural network, or may also be transmitted to be mounted to another apparatus such as a terminal or an external apparatus through the communication interface 110.

In addition, when the learning model is updated, the updated learning model may be transmitted to be mounted to another apparatus such as a terminal or an external apparatus through the communication interface 110.

In addition, the learning model may be used to infer a result value for new input data rather than training data.

The learning processor 140 may be configured to receive, classify, store, and output information to be used for data mining, data analysis, intelligent decision making, and machine learning algorithm and technique.

The learning processor 140 may include one or more memories configured to store data received, detected, sensed, generated, predetermined, or output by an apparatus communicating with another component, an external apparatus, or the neural network apparatus 100.

The learning processor 140 may include a memory integrated with or implemented in the neural network apparatus 100. In some embodiments, the learning processor 140 may be implemented by using the memory 130.

Alternatively or additionally, the learning processor 140 may be implemented by using an external memory coupled directly to the terminal or a memory connected with the terminal such as a memory maintained in a server communicating with the terminal.

In another embodiment, the learning processor 140 may be implemented by using a memory maintained in the cloud computing environment, or another remote memory location accessible by the terminal through a communication method such as a network.

In general, the learning processor 140 may be configured to store data in one or more databases to identify, index, categorize, manipulate, store, search, and output data in order to be used for supervised or non-supervised learning, data mining, predictive analysis, or used in the other machine. Here, the database may be implemented by using memory 130, a memory maintained in the cloud computing environment, or another remote memory location accessible by the terminal through a communication method such as a network.

The information stored in the learning processor 140 may be used by the processor 160 by using any of various different types of data analysis algorithms and machine learning algorithms.

As an example of such an algorithm, a k-nearest neighbor system, fuzzy logic (for example, possibility theory), a neural network, a Boltzmann machine, vector quantization, a pulse neural network, a support vector machine, a maximum margin classifier, hill climbing, an inductive logic system, a Bayesian network, (for example, a finite state machine, a Mealy machine, a Moore finite state machine), a classifier tree (for example, a perceptron tree, a support vector tree, a Markov Tree, a decision tree forest, an arbitrary forest), a reading model and system, artificial fusion, sensor fusion, image fusion, reinforcement learning, augmented reality, pattern recognition, automated planning, and the like, may be provided.

The processor 160 may determine or predict at least one executable operation of the neural network apparatus 100 based on the information determined or generated by using data analysis and a machine learning algorithm. For this purpose, the processor 160 may request, retrieve, receive, or utilize data of the learning processor 140, and control the neural network apparatus 100 to execute the operation predicted, or an operation determined to be preferable among the at least one executable operation.

The processor 160 may perform various functions for implementing intelligent emulation (i.e., a knowledge-based system, an inference system, and a knowledge acquisition system). This may be applied to various types of systems (e.g., fuzzy logic system) including an adaptive system, a machine learning system, an artificial neural network, etc.

The processor 160 may also include a sub module for enabling operation accompanied by speech and natural language speech processing, such as an I/O processing module, an environmental condition module, a Speech-to-Text (STT) processing module, a natural language processing module, a workflow processing module, and a service processing module.

Each of these sub modules may have access to one or more systems or data and models at the terminal, or a subset or superset thereof. In addition, each of these sub modules may provide various functions including a lexical index, a user data, a workflow model, a service model, and an automatic speech recognition (ASR) system.

In another embodiment, another aspect of the processor 160 or the neural network apparatus 100 may be implemented by the sub module, the system, or the data and the model.

In some examples, based on the data of the learning processor 140, the processor 160 may be configured to detect and sense the requirement based on the contextual condition or the user's intention expressed in user input or natural language input.

The processor 160 may actively derive and obtain the information required for completely determining the requirement based on the contextual condition or the user's intention. For example, the processor 160 may actively derive the information required for determining the requirement by analyzing historical data including the past input and output, pattern matching, an unambiguous word, input intention, etc.

The processor 160 may determine a task flow for executing a function responding to the requirement based on the contextual condition or the user's intention.

The processor 160 may be configured to collect, sense, extract, detect, and/or receive a signal or data used for data analysis and machine learning work through one or more sensing components in the terminal, in order to collect information for processing and storage in the learning processor 140.

Information collection may include sensing information through a sensor, extracting information stored in the memory 130, or receiving information from an external terminal, an entity or an external storage apparatus through a communication means.

The processor 160 may collect usage history information from the neural network apparatus 100 to store it in the memory 130.

The processor 160 may determine the best match for executing a specific function by using the stored usage history information and predictive modeling.

The processor 160 may receive image information (or corresponding signal), audio information (or corresponding signal), data or user input information from the input interface 120.

The processor 160 may collect the information in real time, process or classify the information (e.g., knowledge graph, command policy, personalization database, conversation engine, etc.), and store the processed information in the memory 130 or the learning processor 140.

When the operation of the neural network apparatus 100 is determined based on the data analysis and the machine learning algorithm and technique, the processor 160 may control the component of the neural network apparatus 100 in order to execute the determined operation. In addition, the processor 160 may perform the operation determined by controlling the neural network apparatus 100 according to a control command.

When a specific operation is performed, the processor 160 may analyze historical information indicating execution of the specific operation through the data analysis and the machine learning algorithm and technique, and update the previously learned information based on the analyzed information.

Accordingly, the processor 160, together with learning processor 140, may improve the accuracy of future performance of the data analysis and the machine learning algorithm and technique based on the updated information.

The power supplier 150 includes an apparatus for supplying power to the respective components included in the neural network apparatus 100 by receiving an external power or an internal power under the control of the processor 160.

In addition, the power supplier 150 includes a battery, and the battery may be a built-in battery or a replaceable battery.

A method for learning a batch normalization layer of an artificial neural network model learned by the learning processor 140 will be specifically described.

FIG. 2 is a diagram illustrating a structure of an artificial neural network model including a batch normalization layer according to an embodiment of the present disclosure.

Referring to FIG. 2, the artificial neural network model may include a first neural network layer 210, a batch normalization layer 220, and a second neural network layer 230.

As described above, the artificial neural network model may receive training data for learning of the artificial neural network model through the input interface 120.

At this time, the training data may be input to the first neural network layer 210 by a mini-batch unit for batch normalization transform.

For example, assuming that the total number of training data is N, and assuming that the number of data included in the mini-batch is m, the mini-batch may be determined as N/m.

For example, if the total training data is 10 and data to be included in the mini-batch is 2, the mini-batch composed of two training data (components) is 10/2=5, such that the first neural network layer 210 may receive by dividing the training data into five mini-batches.

Next, the first neural network layer 210 may generate first layer output values by a mini-batch unit by using the received training data.

Here, the batch normalization layer 220 may perform batch normalization transform in order to use the generated first layer output values as an input value for the second layer 230.

The batch normalization layer 220 means a layer for performing the batch normalization transform for the first layer (or previous layers) output values, in order to reduce Gradient Vanishing or Gradient Exploding that may occur in the neural network learning process due to a change in the distribution of the input values of each layer caused by a change in the parameter of the first layer (or previous layers).

That is, the batch normalization layer 220 is for reducing an internal covariate shift that may occur during artificial neural network learning, and the batch normalization may be applied through the following assumption.

The batch normalization assumes that the respective features input to the training data have already been uncorrelated, calculates a mean and a variance in a scalar form only for each feature, and applies by performing normalization by using the calculated mean and variance, respectively.

However, simply fixing the mean to 0 and the variance to 1 in the batch normalization may cause a problem that removes nonlinearity of the activation function. For example, if a sigmoid input is a mean of 0 and a variance of 1, there may occur a problem in that the output portion appears to be closer to a straight line form than a curve.

In addition, the assumption that the features have already been uncorrelated may limit what the neural network model may represent. In order to supplement these problems, the batch normalization method obtains by transforming the normalized values by using a gamma, which is a scale parameter and a beta, which is a shift parameter, respectively, and learning these variables together in a back-propagation process.

At this time, the batch normalization is calculated by approaching by the mini-batch unit, rather than calculating the mean and the variance for the entire training data. That is, a method for calculating the mean and the variance only within the currently selected mini-batch and normalizing by using the mean and the variance calculated by the selected mini-batch unit is used.

The equations used in the batch normalization are as follows.

$$\mu_B \leftarrow \frac{1}{m}\sum_{i=1}^{m} x_i \text{//mini-batch mean} \quad \text{Equation 1}$$

$$\sigma_B^2 \leftarrow \frac{1}{m}\sum_{i=1}^{m}(x_i - \mu_B)^2 \text{//mini-batch variance} \quad \text{Equation 2}$$

$$\hat{x}_i \leftarrow \frac{x_i - \mu_B}{\sqrt{\sigma_B^2 + \epsilon}} \text{//normalize} \quad \text{Equation 3}$$

$$y_i \leftarrow \gamma \hat{x}_i + \beta \equiv BN_{\gamma,\beta}(x_i) \text{//scale and shift} \quad \text{Equation 4}$$

The Equations 1 and 2 are equations for calculating the mean and the variance of the mini-batch, the Equation 3 is an equation for calculating the normalized value of $x_i$ by using the mean and the variance calculated from the mini-batch, and the Equation 4 is an equation for performing normalization transform by multiplying the normalized value of $x_i$ by a gamma, which is a scale parameter, and adding a beta, which is a shift parameter.

When a chain rule is applied to the Equations 1 to 4, the gradients for each parameter of the loss function may be calculated as in the following Equations 5 to 10.

$$\frac{\partial \ell}{\partial \hat{x}_i} = \frac{\partial \ell}{\partial y_i} \cdot \gamma \quad \text{Equation 5}$$

$$\frac{\partial \ell}{\partial \sigma_B^2} = \sum_{i=1}^{m} \frac{\partial \ell}{\partial \hat{x}_i} \cdot (x_i - \mu_B) \cdot \frac{-1}{2}(\sigma_B^2 + \epsilon)^{-3/2} \quad \text{Equation 6}$$

$$\frac{\partial \ell}{\partial \mu_B} = \left(\sum_{i=1}^{m} \frac{\partial \ell}{\partial \hat{x}_i} \cdot \frac{-1}{\sqrt{\sigma_B^2 + \epsilon}}\right) + \frac{\partial \ell}{\partial \sigma_B^2} \cdot \frac{\sum_{i=1}^{m} -2(x_i - \mu_B)}{m} \quad \text{Equation 7}$$

$$\frac{\partial \ell}{\partial x_i} = \frac{\partial \ell}{\partial \hat{x}_i} \cdot \frac{1}{\sqrt{\sigma_B^2 + \epsilon}} + \frac{\partial \ell}{\partial \sigma_B^2} \cdot \frac{2(x_i - \mu_B)}{m} + \frac{\partial \ell}{\partial \mu_B} \cdot \frac{1}{m} \quad \text{Equation 8}$$

$$\frac{\partial \ell}{\partial \gamma} = \sum_{i=1}^{m} \frac{\partial \ell}{\partial y_i} \cdot \hat{x}_i \quad \text{Equation 9}$$

$$\frac{\partial \ell}{\partial \beta} = \sum_{i=1}^{m} \frac{\partial \ell}{\partial y_i} \quad \text{Equation 10}$$

That is, since the batch normalization method performs normalization by a mini-batch unit, in order to learn the current index i training data, learning should be performed not only by the index i but also by the mini-batch unit due to the normalization process.

That is, the batch normalization method requires the operational processing capability and the storage space that are difficult to process in the on-device, in that all data values of the mini-batch unit and the statistic calculation of the mini-batch unit as well as the data for the current index i are required.

That is, since the on-device neural network learning apparatus has limited operational processing capability and limited storage space, it is necessary to modify the equation of the batch normalization in the direction of reducing the amount of operations and the storage space required for operation in order to use the batch normalization method in the on-device state.

For example, it is possible to modify the equation in the direction of excluding or simplifying the calculation of the mini-batch unit in the batch normalization method, thereby reducing the amount of operations.

The batch normalization transform according to an embodiment of the present disclosure may transform by setting the gradient for the standard deviation and the gradient for the mean of the loss function to zero, and transform by applying the normalized statistic value obtained from the initial neural network or the previous neural network to the gradient of the loss function.

The normalized statistic value may include the number of data per each set, a mean, and a standard deviation operated in each mini-batch set or the data set.

That is, in order to exclude or simplify the calculation of the mini-batch unit, a method for simply performing the calculation of the gradient for the standard deviation (variance) and the gradient for the mean represented in the Equations 6 and 7 may be considered.

Here, if the gradient for the standard deviation of the loss function and the gradient for the mean of the loss function are set to zero $$\left(\frac{\partial l}{\partial \sigma_B^2} = 0, \frac{\partial l}{\partial \mu_B} = 0\right)$$

so that the calculation of the gradient for the standard deviation (variance) and the gradient for the mean is simplified, the Equation 8 may be simply represented as in the following Equation 11.

$$\frac{\partial l}{\partial x_i} = \frac{\partial l}{\partial \hat{x}_i} \cdot \frac{1}{\sqrt{\sigma^2 + \epsilon}} \qquad \text{Equation 11}$$

Referring to the Equation 11, since the gradient for the standard deviation and the gradient for the mean have been assumed to be zero, the gradient value for x may be simply represented as a normalized value of $x_i$ and a value of the standard deviation (variance).

However, a method capable of replacing the mean and the standard deviation without the normalization calculation process of the current min-batch unit is required, in that the normalized values (mean, standard deviation) and the value of the standard deviation required for the calculation of the Equation 11 also require the mean and the variance calculated in the current mini-batch unit.

FIG. 3 is a diagram illustrating a state where transfer learning is performed by using the mean and the variance obtained from a previous neural network model.

The transfer learning means learning by reusing the neural network model again, when a neural network model that has already been learned with a specific purpose is present, and is a learning model performed by assuming that the current training data has the same distribution as the existing training data.

That is, referring to FIG. 3, in the situation of transfer learning, assuming that the current training data has the same distribution as the existing training data, learning may be performed by reusing the mean and the variance obtained from the previous neural network again.

That is, assuming that the distribution of the current training data has the same distribution as the training data of the initial neural network (or the previous neural network) similar to the situation of transfer learning, the values of the mean and the standard deviation of the current mini-batch unit required for the calculation of the Equation 11 may also be used by being replaced with the values of the mean and the standard deviation obtained from the initial neural network or the previous neural network.

That is, in order to reduce the amount of operations and the storage space required for the operation in the batch normalization method, assuming that the current training data has the same distribution as the existing training data, it may be calculated by applying the normalized statistic value obtained from the initial neural network or the previous neural network to the gradient of the loss function.

In addition, the batch normalization transform according to an embodiment of the present disclosure may transform by setting the gradient for the standard deviation of the loss function and the gradient for the mean of the loss function to zero, and transform by applying the normalized statistic value of the mini-batch set operated before one mini-batch to the gradient of the loss function.

As described above, when the gradient for the standard deviation (variance) of the loss function and the gradient for the mean of the loss function are set to zero $$\left(\frac{\partial l}{\partial \sigma_B^2} = 0, \frac{\partial l}{\partial \mu_B} = 0\right)$$

in order to exclude the calculation of the mini-batch unit, as in the Equation 11, the gradient value for x may simply be represented as the normalized value of $x_i$ and the value of the standard deviation (variance).

However, a method capable of replacing the mean and the standard deviation without the normalization calculation process of the current mini-batch unit is required, in that the normalized values (mean, standard deviation) and the value of the standard deviation required for the calculation of the Equation 11 also require the mean and the variance calculated in the current mini-batch unit.

FIG. 4 is a diagram illustrating a state of obtaining a moving mean and a moving variance by using the mean and the variance up to the previous mini-batch, while calculating the mean and the variance by the mini-batch unit.

For example, FIG. 4 is a method for inferring the mean and the variance of the current mini-batch unit by using the mean and the variance calculated up to the previous mini-batch, in order to exclude the calculation of the current mini-batch unit for the current index i.

That is, FIG. 4 is a diagram illustrating a method for calculating a moving mean and a moving variance by using the mean and the variance calculated up to the previous mini-batch, and using the calculated moving mean and moving variance as the mean and the variance of the current mini-batch unit.

Referring to FIG. 4, when using the moving mean and the moving variance, it is possible to infer the mean and the variance of the current mini-batch unit even without directly calculating the mean and the variance by the current mini-batch unit, and to obtain the moving mean and the moving variance by using the normalized statistic value of the mini-batch set operated before 1 mini-batch.

At this time, since the normalized statistic value of the mini-batch set operated before 1 mini-batch uses only the cumulative value of each data, it may be obtained by cumulating the value when processing each data without having to storing all the data, and calculating the mean and the variance at the completion of mini-batch configuration.

That is, since it is a method for inferring the mean and the variance of the current mini-batch unit with the moving mean and the moving variance without having to calculate the mean and the variance directly by the current mini-batch unit, and using the normalized statistic value of the mini-batch set operated before 1 mini-batch, it may be used as a batch normalization layer training method of the on-device artificial neural network.

In addition, the batch normalization transform according to an embodiment of the present disclosure may transform by setting the gradient for the standard deviation of the loss function and the gradient for the mean of the loss function to zero, generate a data set by selecting the previous training data except for the current index i by the number of data of the mini-batch set in the reverse order, calculate the normalized statistic value of the generated data set, and apply the calculated normalized statistic value of the data set to the gradient of the loss function.

As described above, when the gradient for the standard deviation (variance) of the loss function and the gradient for the mean of the loss function are set to zero $$\left(\frac{\partial l}{\partial \sigma_B^2} = 0, \frac{\partial l}{\partial \mu_B} = 0\right)$$

in order to exclude the calculation of the mini-batch unit, as in the Equation 11, the gradient value for x may simply be represented as the normalized value of $x_i$ and the value of the standard deviation (variance).

However, a method capable of replacing the mean and the standard deviation without the normalization calculation process of the current mini-batch unit is required, in that the normalized values (mean, standard deviation) and the value of the standard deviation required for the calculation of the Equation 11 also require the mean and the variance calculated in the current mini-batch unit.

At this time, as the method similar to the moving mean calculated before 1 mini-batch, a method for obtaining the mean and the variance by generating the data set by selecting the previous training data except for the current index i by the number of data of the mini-batch set in the reverse order may be considered.

That is, it is a method for calculating the mean and the variance, which are normalized statistic values, by selecting the previous data except for the current index i data by the number of data of the mini-batch set rather than the moving mean obtained in the unit before 1 mini-batch unit.

That is, this method may include some data before 1 mini-batch and some data in the current mini-batch to calculate the mean and the variance, in that the previous data except for the current index i data are used.

In addition, since this method uses the previous data based on the current index i data, it is possible to reduce the amount of operations and the storage space, in that the normalized statistic value may not be obtained by the current mini-batch, it is not necessary to store the statistic values by the mini-batch, and the normalized statistic value is obtained by a method for cumulating the data value simply.

In addition, the batch normalization transform according to an embodiment of the present disclosure may transform by using only the data value for the current index i, and transform by applying the normalized statistic value obtained from the initial neural network or the previous neural network to the gradient of the loss function.

For example, in order to reduce the amount of operations and the storage space required for operation in the batch normalization method, it is possible to perform the batch normalization transform by using only the data value for the current index i, thereby excluding the calculation of the mini-batch unit.

That is, it is possible to apply the batch normalization transform considering only the current index i without having to calculate the normalized statistic value of all data included in the current mini-batch.

The batch normalization equation considering only the current index i may be represented as in the following Equations 12 to 14.

$$\frac{\partial l}{\partial \sigma^2} = \frac{\partial l}{\partial \hat{x}_i} \cdot (x_i - \mu) \cdot \frac{-1}{2} \cdot (\sigma^2 + \epsilon)^{-3/2} \qquad \text{Equation 12}$$

$$\frac{\partial l}{\partial \mu} = \frac{\partial l}{\partial \hat{x}_i} \cdot \frac{-1}{\sqrt{\sigma^2 + \epsilon}} \qquad \text{Equation 13}$$

$$\frac{\partial l}{\partial x_i} = \qquad \text{Equation 14}$$

$$\frac{\partial l}{\partial \hat{x}_i} \cdot \frac{1}{\sqrt{\sigma^2 + \epsilon}} + \frac{\partial l}{\partial \sigma^2} \cdot 2(x_i - \mu) + \frac{\partial l}{\partial \mu} = \frac{\partial l}{\partial \sigma^2} \cdot 2(x_i - \mu)$$

That is, the Equations 12 to 14 are equations transformed considering sigma values represented by the mini-batch unit in the Equations 6 to 8 for only the current index i.

However, referring to the Equations 12 to 14, the Equations 12 to 14 are equations transformed considering only the current index i, but it may be confirmed that they still require the mean and variance values by the current mini-batch unit.

That is, a method capable of replacing the mean and the variance without the calculation of the current mini-batch unit is required, in that the normalized value, the mean value, and the value of the standard deviation required for the Equations 12 to 14 also require the mean and the variance calculated in the current mini-batch unit.

At this time, as the method capable for replacing the mean and the variance without the normalization calculation process of the current mini-batch unit, a method for using the mean and the variance of the previous neural network in the above-described transfer learning model of FIG. 3 may be applied.

That is, referring to FIG. 3, assuming that the distribution of the current training data has the same distribution as the training data of the initial neural network (or previous neural network) similar to the situation of the transfer learning, the normalized value, the mean value, and the value of the standard deviation by the current mini-batch unit required for the calculation of the Equations 12 to 14 may also be used by being replaced with the values of the mean and the standard deviation obtained from the initial neural network or the previous neural network.

In addition, the batch normalization transform according to an embodiment of the present disclosure may transform by using only the data value for the current index i, and transform by applying the normalized statistic value of the mini-batch set operated before 1 mini-batch to the gradient of the loss function.

As described above, in order to reduce the amount of operations and the storage space required for operation in the batch normalization method, the batch normalization transform is possible by using only the data value for the current index i, and the Equation at this time is represented as the Equations 12 to 14.

However, referring to the Equations 12 to 14, the Equations 12 to 14 are equations transformed considering only the current index i, but it may be confirmed that they still require the mean and variance values by the current mini-batch unit.

That is, a method capable of replacing the mean and the variance without the calculation of the current mini-batch unit is required, in that the normalized value, the mean value, and the value of the standard deviation required for the Equations 12 to 14 also require the mean and the variance calculated in the current mini-batch unit.

At this time, the above-described method for calculating the moving mean and the moving variance of FIG. 4 may be used.

That is, referring to FIG. 4, when using the moving mean and the moving variance, it is possible to infer the mean and the variance of the current mini-batch unit without directly calculating the mean and the variance by the current mini-batch unit, and to obtain by using the normalized statistic value of the mini-batch set operated before 1 mini-batch.

That is, it is possible to infer the mean and the variance of the current mini-batch unit by the moving mean and the moving variance without having to calculate the mean and the variance directly by the current mini-batch unit. Since it is a method for using the normalized statistic value of the mini-batch set operated before 1 mini-batch, it may be used as the on-device batch normalization layer training method of the artificial neural network.

In addition, the batch normalization transform according to an embodiment of the present disclosure may transform by using only the data value for the current index i, generate the data set by selecting the previous training data except for the current index i by the number of data of the mini-batch set in the reverse order, calculate the normalized statistic value of the generated data set, and apply the calculated normalized statistic value of the data set to the gradient of the loss function.

As described above, in order to reduce the amount of operations and the storage space required for operation in the batch normalization method, the batch normalization transform is possible by using only the data value for the current index i, and the equations at this time are represented as the Equations 12 to 14.

However, referring to the Equations 12 to 14, the Equations 12 to 14 are equations transformed considering only the current index i, but it may be confirmed that they still require the mean and variance values by the mini-batch unit.

That is, a method capable of replacing the mean and the variance without the calculation of the mini-batch unit is required, in that the normalized value, the mean value, and the value of the standard deviation required for the Equations 12 to 14 also require the mean and the variance calculated in the mini-bath unit.

At this time, in a method similar to the moving mean calculated before 1 mini-batch, a method for obtaining the mean and the variance by generating the data set by selecting the previous training data except for the current index i by the number of data of the mini-batch set in the reverse order may be applied.

That is, it is a method for calculating the mean and the variance, which are the normalized statistic value, by selecting the previous data except for the current index i data by the number of data of the mini-batch set rather than the moving mean obtained in the unit before 1 mini-batch.

That is, this method includes some data before 1 mini-batch and some data of the current mini-batch to calculate the mean and the variance, in that the previous data except for the current index i data are used.

In addition, since this method uses the previous data based on the current index i data, it is possible to reduce the amount of operations and the storage space, in that the normalized statistic value may not be obtained by the current mini-batch, it is not necessary to store the statistic values by the mini-batch unit, and the normalized statistic value is obtained by a method for accumulating the data value simply.

In the artificial neural network model according to an embodiment of the present disclosure, although it has been described that the batch normalization layer 220 is positioned between the first layer 210 and the second layer 230, it may also be positioned before the first layer 210, and it is also possible to directly perform the batch normalization transform for the training data and then input it to the first layer 210.

Hereinafter, a batch normalization layer training method will be described with reference to FIGS. 5 and 6.

FIG. 5 is a flowchart for explaining a batch normalization layer training method for setting the gradients for the standard deviation and the mean to zero according to an embodiment of the present disclosure.

Referring to FIG. 5, in operation S510, the artificial neural network model may receive the training data by the mini-batch unit through the input interface 120.

For example, for learning of the artificial neural network model, the training data may be input to the artificial neural network model through the input interface 120, and input to the first neural network layer 210 by the mini-batch unit for batch normalization transform.

In operation S520, the first neural network layer 210 may generate first layer output values by the mini-batch unit by using the received training data.

In operation S530, the batch normalization layer 220 may perform the batch normalization transform in order to use the generated first layer output values as an input value of the second layer, and transform by setting the gradient for the standard deviation of the loss function and the gradient for the mean of the loss function to zero, in order to exclude or simplify the calculation of the current mini-batch unit.

However, when the gradient for the standard deviation (variance) of the loss function and the gradient for the mean of the loss function are set to zero $$\left( \frac{\partial l}{\partial \sigma_B^2} = 0, \frac{\partial l}{\partial \mu_B} = 0 \right)$$

in order to exclude the calculation of the current mini-batch unit, it is represented as in the Equation 11, and a method capable of replacing the mean and the standard deviation without the normalization calculation process of the current mini-batch unit is required, in that the normalized values (mean, standard deviation) and the value of the standard deviation required for the calculation of the Equation 11 also require the mean and the variance calculated in the current mini-batch unit.

At this time, as the method capable of replacing the mean and the standard deviation without the normalization calculation process of the current mini-batch unit, the above-described method for using the mean and the variance of the previous neural network in the transfer learning model of FIG. 3 may be applied.

That is, referring to FIG. 3, assuming that the current training data has the same distribution as the existing training data, it may be calculated by replacing the normalized value (mean, standard deviation) of the current mini-batch unit required for the calculation of the Equation 11 with the mean and the variance obtained in the previous neural network.

In addition, as the method capable for replacing the mean and the standard deviation without the normalization calculation process of the current mini-batch unit, the above-described method for inferring the mean and the variance of the current mini-batch unit by using the mean and the variance calculated up to the previous mini-batch of FIG. 4 may be applied.

Referring to FIG. 4, when using the moving mean and the moving variance, it is possible to infer the mean and the variance of the current mini-batch unit without directly calculating the mean and the variance by the current mini-batch unit, and to obtain the moving mean and the moving variance by using the normalized statistic value of the mini-batch set operated before 1 mini-batch.

That is, it may be calculated by replacing the normalized value (mean, standard deviation) of the current mini-batch unit required for the calculation of the Equation 11 with the moving mean and the moving variance obtained by using the normalized statistic value of the mini-batch set operated before 1 mini-batch.

In addition, as the method capable for replacing the mean and the variance without the normalization calculation process of the current mini-batch unit, a method for obtaining the mean and the variance by generating the data set by selecting the previous training data except for the current index i by the number of data of the mini-batch set in the reverse order may be applied as the method similar to the moving mean calculated before 1 mini-batch.

That is, it may be calculated by replacing the normalized value (mean, standard deviation) of the current mini-batch unit required for the calculation of the Equation 11 with the mean and the variance of the data set generated by selecting the previous training data except for the current index i by the number of data of the mini-batch set in the reverse order.

In operation S540, the batch normalization layer 220 may normalize and output the first layer output values by using the batch normalization transform.

For example, the batch normalization layer 220 may generate the batch normalization layer output by performing the batch normalization transform for the first layer output values by the mini-batch unit.

However, according to an embodiment of the present disclosure, in order to exclude the calculation of the mini-batch unit, a method for setting the gradients for the standard deviation (variance) and the mean of the loss function to zero $$\left(\frac{\partial l}{\partial \sigma_B^2} = 0, \frac{\partial l}{\partial \mu_B} = 0\right),$$

and replacing the mean and the standard deviation without the normalization calculation process of the current mini-batch unit is used to perform the batch normalization transform, such that it is also possible to directly batch-normalize and output the currently input first layer output values.

Next, the first layer output values batch-normalized by the batch normalization layer 220 may be provided as an input for the second neural network layer 230.

FIG. 6 is a flowchart for explaining the batch normalization layer training method transformed by using only the data value for the current index i according to an embodiment of the present disclosure.

Referring to FIG. 6, in operation S610, the artificial neural network model may receive the training data by the mini-batch unit through the input interface 120.

For example, in order to learn the artificial neural network model, the training data may be input to the artificial neural network model through the input interface 120, and input to the first neural network layer 210 by the mini-batch unit for the batch normalization transform.

In operation S620, the first neural network layer 210 may generate the first layer output values by the mini-batch unit by using the received training data.

In operation S630, the batch normalization layer 220 may perform the batch normalization transform in order to use the generated first layer output values as an input value for the second layer, and transform by using only the data value for the current index i in order to exclude or simplify the calculation of the current mini-batch unit.

However, when it transforms by using only the data value for the current index i in order to exclude the calculation of the current mini-batch unit, it is represented as in the Equations 12 to 14, and a method capable of replacing the mean and the variance without the calculation of the current mini-batch unit is required, in that the normalized value, the mean value, and the value of the standard deviation required for the Equations 12 to 14 also require the mean and the variance calculated in the current mini-batch unit.

At this time, as the method capable of replacing the mean and the standard deviation without the normalization calculation process of the current mini-batch unit, the above-described method for using the mean and the variance of the previous neural network in the transfer learning model of FIG. 3 may be applied.

That is, referring to FIG. 3, assuming that the distribution of the current training data has the same distribution as the training data of the initial neural network (or the previous neural network) similar to the situation of the transfer learning, the normalized value, the mean value, and the value of the standard deviation by the current mini-batch unit required for the calculation of the Equations 12 to 14 may also be used by being replaced with the values of the mean and the standard deviation obtained from the initial neural network or the previous neural network.

In addition, as the method capable of replacing the mean and the standard deviation without the normalization calculation process of the current mini-batch unit, the above-described method for inferring the mean and the variance of the current mini-batch unit by using the mean and the variance calculated up to the previous mini-batch of FIG. 4 may be applied.

Referring to FIG. 4, when using the moving mean and the moving variance, it is possible to infer the mean and the variance of the current mini-batch unit without directly calculating the mean and the variance by the current mini-batch unit, and to obtain the moving mean and the moving variance by using the normalized statistic value of the mini-batch set operated before 1 mini-batch.

That is, it may be calculated by replacing the normalized statistic value, the mean value, and the value of the standard deviation of the current mini-batch unit required for the Equations 12 to 14 with the moving mean and the moving variance obtained by using the normalized statistic value of the mini-batch set operated before 1 mini-batch.

In addition, as the method capable of replacing the mean and the standard deviation without the normalization calculation process of the current mini-batch unit, a method for obtaining the mean and the variance by generating the data set by selecting the previous training data except for the current index i by the number of data of the mini-batch set in the reverse order may be applied as the method similar to the moving mean calculated before 1 mini-batch.

That is, it may be calculated by replacing the normalized value, the mean value, and the value of the standard deviation of the current mini-batch unit required for the Equations 12 to 14 with the mean and the variance of the data set generated by selecting the previous training data except for the current index i by the number of data in the reverse order.

In operation S640, the batch normalization layer 220 may normalize and output the first layer output values by using the batch normalization transform.

For example, the batch normalization layer 220 may generate the batch normalization layer output by performing the batch normalization transform for the first layer output values by the mini-batch unit.

However, according to an embodiment of the present disclosure, in order to exclude the calculation of the mini-batch unit, a method for using only the data value for the current index i, and replacing the mean and the standard deviation without the normalization calculation process of the current mini-batch unit is used to perform the batch normalization transform, such that it is also possible to directly batch-normalize and output the currently input first layer output values.

Next, the first layer output values batch-normalized by the batch normalization layer 220 may be provided as an input for the second neural network layer 230.

In the batch normalization layer training method according to an embodiment of the present disclosure, although it has been described that the batch normalization layer 220 is positioned between the first layer 210 and the second layer 230, it may also be positioned before the first layer 210, and it is also possible to directly batch-transform the training data and then input it to the first layer 210.

Regarding the batch normalization layer training method according to an embodiment of the present disclosure, the contents of the artificial neural network model including the above-described batch normalization layer may be applied. Accordingly, regarding the batch normalization layer training method, descriptions of the same content as the above-described content of the artificial neural network model including the batch normalization layer have been omitted.

The above-mentioned present disclosure may be implemented as a computer-readable code in a recording medium in which at least one program is written. The computer readable medium includes all types of recording devices in which data readable by a computer system readable may be stored. Examples of the computer readable medium include a Hard Disk Drive (HDD), a Solid State Disk (SSD), a Silicon Disk Drive (SDD), a ROM, a RAM, a CD-ROM, a magnetic tape, a floppy disk, an optical data storage device, etc. Moreover, the computer may include a processor of a terminal, an electronic device, and the like.

The foregoing description of the present disclosure is intended for illustration, and it will be understood by those skilled in the art to which the present disclosure pertains that the present disclosure may be modified in other specific forms without changing the technical spirit or features of the present disclosure. Accordingly, it should be understood that the above-described example embodiments are not restrictive. For example, each component described as a single type may also be embodied in a distributed manner, and likewise, the components described as being distributed may also be embodied in a combined form.

The scope of the present disclosure is shown by the following claims rather than the detailed description, and all changes or modifications derived from the meaning and scope of the claims and their equivalent concepts should be construed as being included in the scope of the present disclosure.

What is claimed is:

1. A learning apparatus for training a neural network, the learning apparatus comprising:
   a learning processor configured to train an artificial neural network model based on training data,
   wherein the artificial neural network model comprises:
      a first neural network layer;
      a second neural network layer; and
      a batch normalization layer between the first neural network layer and the second neural network layer,
   wherein the first neural network layer is configured to:
      receive the training data by a mini-batch unit, and
      generate first layer output values by the mini-batch unit,
   wherein the batch normalization layer is configured to:
      receive the first layer output values generated by the mini-batch unit,
      generate a batch normalization layer output by performing a batch normalization transform for the first layer output values, and
      supply the batch normalization layer output as an input to the second neural network layer, and
   wherein the batch normalization transform transforms by setting both a gradient for a standard deviation of a loss function and a gradient for a mean of the loss function to zero.

2. The learning apparatus of claim 1, wherein the batch normalization transform transforms by applying a normalized statistic value obtained from an initial neural network or a previous neural network to the gradient of the loss function.

3. The learning apparatus of claim 1, wherein the batch normalization transform transforms by applying a normalized statistic value of a mini-batch set operated before 1 mini-batch to the gradient of the loss function.

4. The learning apparatus of claim 1, wherein the batch normalization transform generates a data set by selecting previous training data except for a current index i by a number of data of a mini-batch set in reverse order, where i is a natural number greater than zero, calculates a normalized statistic value of the data set, and applies the normalized statistic value of the data set to the gradient of the loss function.

5. The learning apparatus of claim 4, wherein the normalized statistic value comprises a number of data per each set, a mean, and a standard deviation operated from each mini-batch set or the data set.

6. A method for training a batch normalization layer, the method comprising:
   receiving training data by a mini-batch unit;
   generating first layer output values of a first neural network layer by the mini-batch unit;
   generating a batch normalization layer output by performing a batch normalization transform for the first layer output values; and
   supplying the batch normalization layer output as an input to a second neural network layer,
   wherein the batch normalization transform comprises transforming by setting both a gradient for a standard deviation of a loss function and a gradient for a mean of the loss function to zero.

7. The method of claim 6, wherein the batch normalization transform further comprises transforming by applying a normalized statistic value obtained from an initial neural network or a previous neural network to the gradient of the loss function.

8. The method of claim 6, wherein the batch normalization transform further comprises transforming by applying a normalized statistic value of a mini-batch set operated before 1 mini-batch to the gradient of the loss function.

9. The method of claim 6, wherein the batch normalization transform further comprises transforming by generating a data set by selecting previous training data except for a current index i by a number of data of the mini-batch set in reverse order, wherein i is a natural number greater than zero, calculating a normalized statistic value of the data set, and applying the normalized statistic value of the data set to the gradient of the loss function.

10. The method of claim 9, wherein the normalized statistic value comprises a number of data per each set, a mean, and a standard deviation operated from each mini-batch set or the data set.

11. A non-transitory computer readable recording medium storing a program for implementing the method of claim 6.

* * * * *